United States Patent
Sun et al.

(10) Patent No.: US 12,187,917 B1
(45) Date of Patent: Jan. 7, 2025

(54) BIOMIMETIC HYBRID NANOCOATING COMPOSITION, METHODS OF USE THEREOF AND COATINGS PRODUCED THEREFROM

(71) Applicant: University of Connecticut, Farmington, CT (US)

(72) Inventors: Luyi Sun, Andover, MA (US); Marina Dabaghian, Marlborough, CT (US)

(73) Assignee: UNIVERSITY OF CONNECTICUT, Farmington, CT (US)

( * ) Notice: Subject to any disclaimer, the term of this patent is extended or adjusted under 35 U.S.C. 154(b) by 0 days.

(21) Appl. No.: 18/372,044

(22) Filed: Sep. 22, 2023

(51) Int. Cl.
| | | |
|---|---|---|
| C09D 7/40 | (2018.01) | |
| B65D 65/42 | (2006.01) | |
| C08J 5/18 | (2006.01) | |
| C08K 7/00 | (2006.01) | |
| C09D 7/61 | (2018.01) | |
| C09D 129/04 | (2006.01) | |

(52) U.S. Cl.
CPC ............... *C09D 7/70* (2018.01); *B65D 65/42* (2013.01); *C08J 5/18* (2013.01); *C08K 7/00* (2013.01); *C09D 7/61* (2018.01); *C09D 129/04* (2013.01); *C08J 2429/04* (2013.01); *C08K 2201/003* (2013.01); *C08K 2201/004* (2013.01); *C08K 2201/011* (2013.01); *C08K 2201/016* (2013.01)

(58) Field of Classification Search
None
See application file for complete search history.

(56) References Cited

U.S. PATENT DOCUMENTS

| | | | |
|---|---|---|---|
| 2005/0191490 A1* | 9/2005 | Ton-That | ................. C08J 5/005 428/407 |
| 2005/0221605 A1* | 10/2005 | Koning | ............. H01L 23/49894 438/623 |
| 2011/0200825 A1* | 8/2011 | Chakraborty | .......... B05D 3/062 428/524 |
| 2011/0288224 A1* | 11/2011 | Gimenez Torres | .... C08J 3/2056 524/447 |
| 2014/0374267 A1* | 12/2014 | Monteiro | ................. C25D 9/04 205/104 |
| 2017/0206997 A1* | 7/2017 | Al-Harthi | .................. C08J 5/18 |
| 2022/0325117 A1 | 10/2022 | Sun et al. | |

FOREIGN PATENT DOCUMENTS

| | | |
|---|---|---|
| WO | 2014063009 A1 | 4/2014 |
| WO | 2021080876 A1 | 4/2021 |

OTHER PUBLICATIONS

Ding et al.; "Biomimetic nanocoatings with exceptional mechanical, barrier, and flame-retardant properties from large-scale one-step coassembly"; Science Advances; 3; Jul. 2017, pp. 1-9.

* cited by examiner

*Primary Examiner* — Tamra L. Dicus
(74) *Attorney, Agent, or Firm* — CANTOR COLBURN LLP (57) ABSTRACT

An article includes a substrate and a coating disposed on the substrate. The coating includes a binder and a plurality of nanosheets. The plurality of nanosheets are arranged in layers and are oriented with their largest surfaces being substantially parallel to a surface of the substrate upon which they are disposed.

18 Claims, 4 Drawing Sheets

BIOMIMETIC HYBRID NANOCOATING COMPOSITION, METHODS OF USE THEREOF AND COATINGS PRODUCED THEREFROM

BACKGROUND OF THE INVENTION

1. Field of the Invention

The disclosure relates to hybrid organic-inorganic coating compositions, methods of use thereof, and nanocomposite coatings produced therefrom.

2. Description of the Related Art

Nanocomposite compositions are produced from mixtures of multiple materials including polymers and nanomaterials. Nanocomposite compositions of a polymer and nanomaterials can provide articles with enhanced properties (such as barrier, mechanical, flame-retardant properties, and so forth) in comparison to non-composite articles made of the primary polymer. It remains a challenge to mass produce nanocomposites that provide high vapor and moisture barrier properties, non-toxicity, and recyclability.

A need remains for scalable production of non-toxic barrier coatings for packaging materials.

SUMMARY OF THE INVENTION

In an embodiment, an article includes a substrate and a coating disposed on the substrate. The coating includes a binder and a plurality of nanosheets. The plurality of nanosheets are arranged in layers and are oriented with their largest surfaces being substantially parallel to a surface of the substrate upon which they are disposed.

In another embodiment, a coating includes a binder and a plurality of nanosheets. The plurality of nanosheets are arranged in layers and are oriented with their largest surfaces being substantially parallel to a surface of a substrate upon which they are disposed.

In yet another embodiment, a method includes transporting a substrate through a coating composition in a first position. The coating composition includes a plurality of nanosheets, a binder, and a solvent. The plurality of nanosheets have lengths and/or widths of 10 to 5,000 nanometers and thicknesses of 1 to 100 nanometers. The substrate with the coating composition disposed thereon is transported through a second position. The second position is inclined at an angle to the first position and an opposing force that facilitates an orientation of the plurality of nanosheets acts upon the coating composition in the second position.

The above described and other features are exemplified by the following figures and detailed description.

BRIEF DESCRIPTION OF THE DRAWINGS

Referring now to the figures, which are exemplary embodiments, and wherein the like elements are numbered alike.

DETAILED DESCRIPTION OF THE INVENTION

Disclosed herein is a hybrid inorganic-organic coating (hereinafter coating) that includes a polymeric binder and high-aspect ratio nanosheets (hereinafter nanosheets) that are layered and are oriented to be substantially parallel to a substrate upon which they are disposed. The coating is also sometimes referred to herein as a "layered coating." The nanosheets arrange themselves in a plurality of interleaved layers on the substrate upon which they are disposed. The interleaving produces a tortuous pathway between the nanosheets, which renders it difficult for ambient molecules (e.g., undesirable ambient gases) to diffuse through the coating. The high level of nanosheet orientation allows for close packing of nanosheet layers, thus maintaining a sub-micron thin coating layer on the substrate. The interleaving of the nanosheets thereby produces a coating that displays enhanced surface coverage at a low cost, barrier properties against penetration by undesirable molecules such as oxygen and water, and mechanical strength when compared with coatings that do not contain such plates or nanosheets.

In an embodiment, the substrate with the coating disposed thereon may be subjected to further processes such as molding to form articles that may be used for food packaging and storage. In another embodiment, the coating may be removed from the substrate to form a free-standing film that may be used as food packaging. The film is generally optically transparent and can be printed upon to display the product that it stores.

Disclosed herein too is a method for producing the coating. The method includes coating the substrate while in a first position with a coating composition that includes the high-aspect ratio nanosheets. The substrate is then reoriented to be in a second position, where it encounters an opposing force that facilitates orientation of the nanosheets. In an embodiment, the opposing force is gravity. In an embodiment, the effect of gravity and counterbalanced centrifugal and centripetal forces cause the nanosheets to slide past each and to orient themselves to be substantially parallel to the substrate. In an embodiment, the substrate is a continuous sheet or a belt that while travelling is immersed into the coating composition in a first position and reoriented into second position where the nanosheets are oriented to form a layered coating. In an embodiment, the first position is oriented at an angle of 60 to 120 degrees or 80 to 100 degrees to the second position. In an embodiment, the first position is a horizontal position while the second position is a vertical position.

The coating composition comprises a binder, a solvent and nanosheets. In an embodiment, a layered mineral can be exfoliated to provide the nanosheets. In an embodiment, the binder and the solvent can interact to facilitate the exfoliation. In another embodiment, a temperature change may be used to facilitate the exfoliation. The exfoliation produces nanosheets that are dispersed in the binder and solvent to form a stable suspension (one where the nanosheets do not undergo phase separation from the coating composition).

"Ambient pressure" as used herein, refers to the atmospheric pressure of an environment surrounding an object. Specifically ambient pressure is a pressure of about 90 kilopascals (kPa) to about 120 kPa.

"Ambient temperature" as used herein, refers to the air temperature of an environment or surface temperature of an object.

"And/or" includes any and all combinations of one or more of the associated listed items.

"Aspect ratio" as used herein, refers to the ratio of length of a nanosheet to its width.

"Nanocoating" as used herein, refers to coatings containing nanomaterials and/or coatings of 1 to 1000 nanometers (nm) thick.

"Nanomaterials" as used herein, refers to materials with at least one dimension that is less than approximately 100 nm.

"Nanosheets" as used herein, refers to two-dimensional nanomaterials with a thickness of 1 to 100 nm.

Figure 1A:
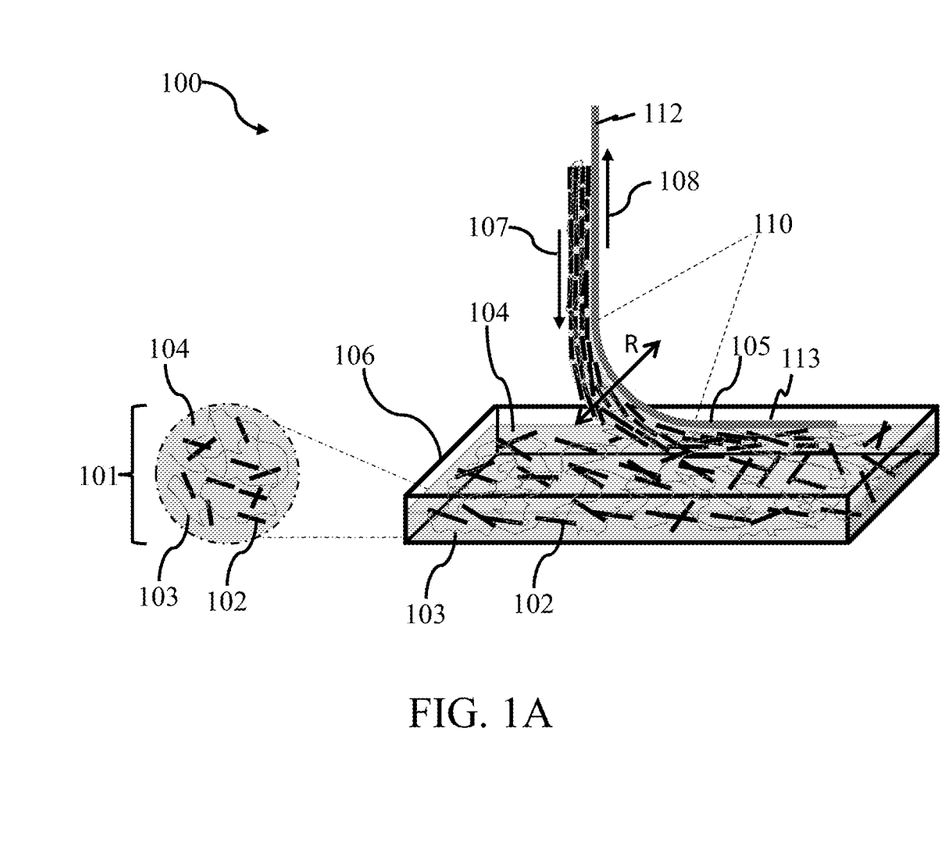
FIG. 1A depicts an embodiment of an exemplary dip coating setup.

FIG. 1 depicts an exemplary dip coating setup 100 for coating substrate 105 with a coating composition 101. As noted above, the coating composition 101 includes exfoliated nanosheets 102 (hereinafter nanosheet 102), a binder 103, and a solvent 104. The nanosheets 102 in the coating composition 101 are randomly oriented. The dip coating setup 100 includes a container 106 configured to hold the coating composition 101. A substrate 105 is dipped into the coating composition 101 and withdrawn in the direction of arrow 108 (away from the container 106). During its travel through the coating composition 101, the substrate 105 enters the container 106 in a generally horizontal orientation 113. The substrate 105 is then bent to change its orientation to vertical at which point it is withdrawn from the coating composition 101. Between the horizontal orientation 113 and the vertical orientation 112 is a bent portion 110 where the substrate 105 undergoes a gradual change in orientation from horizontal to vertical.

When the substrate 105 contacts the coating composition 101, the composition is disposed on the substrate 105. Nanosheets 102 from the composition 101 are disposed on the substrate along with the binder and solvent. Because the nanosheets 102 have high aspect ratios they are oriented preferentially with respect to the substrate 105. In other words, the nanosheets 102 that contact the substrate when it is in the horizontal orientation 113 are more oriented than the nanosheets that are present in the initial coating composition contained in the container 106 (where they are randomly oriented).

As the substrate travels further, it is drawn away from the container first via the bent portion 110 and then into a vertical orientation 112. The bent portion 110 may play a substantial role in the orientation of the nanosheets 102 depending upon the rate of travel of the substrate 105. If the line speed (the rate of travel) of the substrate 105 is greater than 1 meter per second, then the nanosheets that are in contact with the substrate will begin to experience forces in the radial direction R. The centrifugal forces acting on the nanosheets and the counterbalancing centripetal forces acting on the substrate will promote some reorientation of the nanosheets. The orientation of the nanosheets in the bent portion 110 of the substrate is greater than the orientation of the nanosheets on the substrate when it is horizontally oriented. As the substrate 105 is oriented vertically and drawn away from the coating composition 101, the force of gravity promotes the nanosheets to slide against each other and the substrate and to undergo further orientation. The force of gravity (against the materials in the coating composition 101) is indicated by the arrow 107. During withdrawal of the substrate 105, the nanosheets 102 align within the coating composition 101 primarily due to gravity and because of their shape (their high aspect ratios).

This high aspect ratio facilitates a lining up of the nanosheets as the substrate transitions from being horizontally oriented to being vertically oriented. The nanosheets slide past each other under the action of gravity to form a thin highly oriented layered coating that contains interleaved nanosheets. The orientation of the nanosheets during the vertical orientation 112 of the substrate is greater than the orientation of the nanosheets when the substrate is being bent (in the bent portion 110). Thus, as the substrate 105 continues to travel, the orientation of the nanosheets is gradually increased until the solvent is removed and the highly oriented nanosheets are constrained and held in position by the drying binder. In an embodiment, the amount of orientation of the nanosheets may be correlated with at least one of the length of travel of the substrate 105, the velocity of travel of the substrate 105 and the angle between the first position and the second position of the substrate 105. As noted above, the oriented nanosheets are interleaved and are arranged in a layered fashion on the substrate. A longitudinal axis of the nanosheets has an average orientation that is parallel to the substrate.

By varying the concentration of nanosheets and binder in the coating composition and by varying the chemistry of the coating composition, sheets of different thicknesses with different extents of interleaving between the sheets can be obtained.

The nanosheets 102 are obtained by exfoliating a layered mineral. The layered mineral contains plates that are arranged to be substantially parallel to each other prior to being exfoliated. Examples of layered minerals that can be used to produce the nanosheets 102 include clays such as, for example phyllosilicates [e.g., montmorillonite (MMT)], boron nitride (BN), graphite oxide (GO), graphite, tungsten disulfide ($WS_2$), molybdenum disulfide ($MoS_2$), silicates, aluminosilicates, phosphates, phosphonates, layered double hydroxides, metal oxides, metal chalcogenides, metal oxyhalides, metal halides, hydrous metal oxides, or a combination thereof.

The nanosheets have typically to be exfoliated (prior to being utilized in the coating) so that they can be dispersed in the coating composition 101. In an embodiment, the exfoliation may be brought about by thermal treatment, intercalation, or a combination thereof. During exfoliation intermolecular forces that hold the nanosheets together are disrupted thus permitting the nanosheets to come apart from each other and to be dispersed in the binder and solvent. In an embodiment, the nanosheets can be exfoliated in a solvent and a binder can be subsequently added to the exfoliated suspension of nanosheets in the solvent. In an embodiment, the nanosheets can be exfoliated prior to being introduced into the container 106 (i.e., they can be purchased in an exfoliated form). The exfoliation and dispersion of the nanosheets permits the coating composition 101 to be in the form of a stable suspension of the nanosheets, the binder, and the solvent. This stable suspension is then charged to the container 106 and the coating of the substrate is permitted to commence. The stable suspension prevents the ingredients of the coating composition 101 from phase separating during the coating process.

Figure 1B:
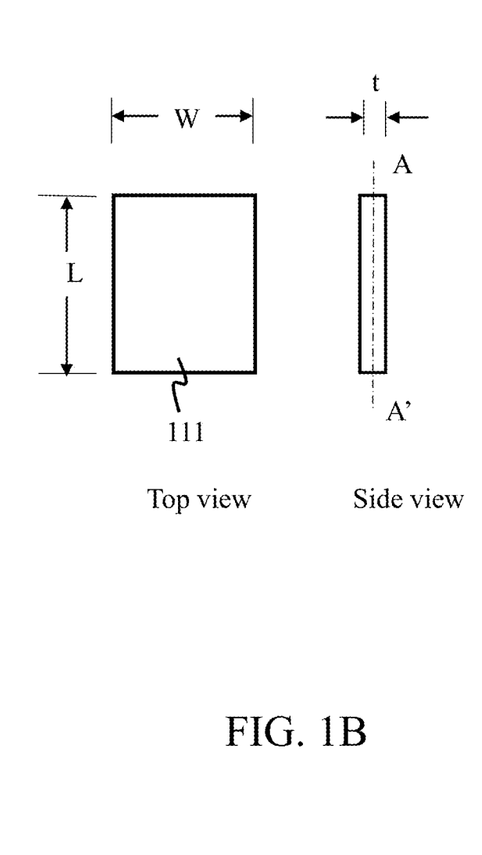
FIG. 1B is a schematic side view and top view of an exemplary single nanosheet.

The nanosheets 102 upon being exfoliated are two-dimensional (they are sheet-like) and have lengths and/or widths of 10 to 10,000 nm or 20 to 1000 nm. The thickness of the nanosheets 102 can be 1 nm to 100 nm or 5 nm to 50 nm. FIG. 1B is a schematic side view and top view of an exemplary single nanosheet. The nanosheet has a length (L), width (W) and thickness (t). As may be seen the length and/or width is significantly greater than the thickness. The nanosheets can have aspect ratios (length or width to thickness ratios) of 10 to 5,000. The high aspect ratios facilitate an orientation of the sheets on the substrate as they contact the substrate from the coating composition. In some embodiments, the dispersion of nanosheets is accomplished in a solvent such as water in the absence of additional chemicals and surfactants. In some embodiments, additives can be added to the nanosheets to facilitate intercalation and/or exfoliation processes.

The nanosheets 102 are present in the coating composition in an amount of 0.1 to 15, preferably 1 to 5 weight percent, based on a total weight of the coating composition 101.

The binder 103 used in the coating composition 101 can be an organic polymer. In an embodiment, it is desirable for the binder to be capable of exfoliating the mineral that contains the nanosheets. It is also desirable for the binder 103 to be compatible with the nanosheets 102. In an embodiment, the organic polymer may be used in the form of a polymer or alternatively, in the form of a polymer precursor.

Organic polymers used in coating composition 101 may be selected from a wide variety of thermoplastic polymers, blend of thermoplastic polymers, thermosetting polymers, or blends of thermoplastic polymers with thermosetting polymers. The organic polymer may also be a blend of polymers, copolymers, terpolymers, or combinations including at least one of the foregoing organic polymers. The organic polymer can also be an oligomer, a homopolymer, a copolymer, a block copolymer, an alternating block copolymer, a random polymer, a random copolymer, a random block copolymer, a graft copolymer, a star block copolymer, a dendrimer, a polyelectrolyte (polymers that have some repeat groups that contain electrolytes), a polyampholyte (a polyelectrolyte having both cationic and anionic repeat groups), an ionomer, an intrinsically conducting polymer, or the like, or a combination including at last one of the foregoing organic polymers. The organic polymers have number average molecular weights greater than 10,000 grams per mole, greater than 20,000 g/mol, or greater than 50,000 g/mol.

Examples of thermoplastic polymers include a polyacrylic, a polycarbonate, a polyalkyd, a polystyrene, a polyolefin, a polyester, a polyamide, a polyaramid, a polyamideimide, a polyarylate, a polyurethane, an epoxy, a phenolic, a polysiloxane, a polyarylsulfone, a polyethersulfone, a polyphenylene sulfide, a polysulfone, a polyimide, a polyetherimide, a polytetrafluoroethylene, a polyetherketone, a polyether ether ketone, a polyether ketone ketone, a polybenzoxazole, a polyoxadiazole, a polybenzothiazole, a polybenzothiazinophenothiazine, a polypyrazinoquinoxaline, a polypyromellitimide, a polyguinoxaline, a polybenzimidazole, a polyoxindole, a polyoxoisoindoline, a polydioxoisoindoline, a polytriazine, a polypyridazine, a polypiperazine, a polypyridine, a polypiperidine, a polytriazole, a polypyrazole, a polycarborane, a polyoxabicyclononane, a polydibenzofuran, a polyphthalide, a polyacetal, a polyanhydride, a polyvinyl ether, a polyvinyl thioether, a polyvinyl alcohol, a polyvinyl ketone, a polyvinyl halide, a polyvinyl nitrile, a polyvinyl ester, a polysulfonate, a polysulfide, a polythioester, a polysulfone, a polysulfonamide, a polyurea, a polyphosphazene, a polysilazane, a polyolefin, a polyethylene glycol, a polylactic acid (PLA), a poly(lactic-co-glycolic acid) (PLGA), or the like, or a combination thereof.

Examples of polyelectrolytes include polystyrene sulfonic acid, polyacrylic acid, pectin, carrageenan, alginates, carboxymethylcellulose, polyvinylpyrrolidone, or the like, or a combination thereof.

Examples of intrinsically conducting polymers include polyaniline, polyacetylene, polypyrrole, poly(3,4-ethylenedioxythiophene) (PEDOT), or a combination thereof. In an embodiment, the intrinsically conducting polymers may be neutralized with an acid.

Examples of thermosetting polymers include epoxy polymers, unsaturated polyester polymers, polyimide polymers, bismaleimide polymers, bismaleimide triazine polymers, cyanate ester polymers, vinyl polymers, benzoxazine polymers, benzocyclobutene polymers, acrylics, alkyds, phenol-formaldehyde polymers, novolacs, resoles, melamine-formaldehyde polymers, urea-formaldehyde polymers, hydroxymethylfurans, isocyanates, diallyl phthalate, triallyl cyanurate, triallyl isocyanurate, unsaturated polyesterimides, or the like, or a combination thereof. In an exemplary embodiment, the binders are water soluble such as polyvinyl alcohol, polyacrylamides, hydroxymethylcellulose, or a combination thereof.

The binder 103 may be present in the coating composition in an amount of 0.1 to 5, preferably 1 to 3 weight percent, based on a total weight of the coating composition 101.

The solvent 104 used in the coating composition to solubilize the binder and optionally to compatibilize the binder with the nanosheets 102. In another embodiment, the solvent may facilitate the exfoliation of the nanosheets 102. It is generally desirable to use solvents that are environmentally friendly and that can be recycled. Examples of these solvents include water, liquid carbon dioxide, liquid nitrogen, ethanol, dimethyl sulfoxide (DMSO), acetone, acetonitrile, methanol, butanol, propanol, tetrahydrofuran, N-methylpyrrolidone (NMP), amine-based organic solvents (e.g., N,N-dimethylpropylamine), water-soluble organic solvents, or a combination thereof, or a combination thereof. Exemplary solvents include water or liquid carbon dioxide.

The solvent 104 is present in the coating composition 101 in an amount of 85.0 to 99.9, preferably 90 to 98 weight percent, based on a total weight of the coating composition 101.

It is to be noted that the coating composition may contain other additives such as surfactants (which may be used to facilitate exfoliation), antioxidants, antiozonants, initiators (which may be used to facilitate crosslinking of polymeric precursors, should they be used to manufacture the binder), anti-bacterial agents, anti-fungal agents, anti-viral agents, cross-linkers, thermal stabilizers, dyes, colorants, pigments, or a combination thereof.

In an embodiment, the coating composition 101 may be manufactured in a separate reactor (not shown) prior to being disposed in the container 106 and being used to coat the substrate 105. The inorganic mineral (from which the nanosheets 102 are obtained), the binder 103 and the solvent 104 are charged to the reactor and subjected to agitation. The binder (in polymeric or in polymeric precursor form) and/or the solvent facilitate an exfoliation of the mineral to form nanosheets 102. In an embodiment, the exfoliation occurs because the binder intercalates the nanosheets 102 and breaks bonds of the inorganic mineral thereby liberating the nanosheets. The nanosheets 102 are dispersed in the binder and the solvent to form the chemical composition. The chemical composition is therefore a stable suspension with the nanosheets 102 randomly dispersed in a mixture of the binder and the solvent. The stable suspension does not undergo phase separation with the passage of time.

The equipment (depicted in the FIG. 1A) and the method of manufacturing the coating will now be discussed in further detail. In some embodiments, the substrate 105 can be partially coated. In other embodiments, the substrate 105, can be coated on multiple surfaces. For example, after coating of a surface of the substrate, the substrate 105 can be re-oriented in the container 106 and a coating can be applied to an additional surface or additional surfaces of the substrate. The coating on the substrate 105 can be on one surface, two surfaces, and/or covering the entire exterior surface of the substrate 105. In some embodiments, the substrate 105 can be coated continuously by passing a portion of the substrate 105 through the container 106 at a time. For example, the substrate 105 can be a roll of film that is coated within the container 106, one portion of the substrate 105 at a time, and the substrate 105 can be passed through the container 106 as the coating process continues on another portion of the substrate 105. Suitable coating systems include rotary coating systems, Mayer rod coating, and roll-to-roll coating assemblies.

In an embodiment, the substrate 105 can be passed through a plurality of different containers 106 (not contain) each of which contain the coating composition. With each passage through a container 106, the coating formed on the substrate 105 is thickened. The coating formed after each immersion in one of the containers 106 (of the plurality of containers) may be dried and/or cured. In an embodiment, the coating formed due to immersion in each container 106 need only be dried. When the coating reaches a desirable thickness, it is subjected to curing using radiation and or thermal energy. Thermal energy is transmitted to the coating via conduction or convection.

The substrate 105 can be a metal, a ceramic or an organic polymer. It is desirable for the substrate to be flexible so that it can be bent during its travel through the coating process. In an embodiment, the substrate may be a rigid substrate under ambient conditions but is temporarily rendered flexible during the coating process. This temporarily induced flexibility may be due to its interaction with the coating composition or due to processing conditions (e.g., elevated temperature and pressure) used during the coating process. The substrate regains its rigidity upon removal of these temporary conditions.

The substrate may be manufactured from the organic polymers listed above. It may include naturally occurring polymers such as hemp, jute, cotton, silk, wool, paper, wood pulp paper, or a combination thereof. Metal and ceramic containing substrates can be ductile in nature. Suitable metals include aluminum, iron, stainless steel, copper, titanium, or alloys thereof. Suitable ceramics include indium titanium oxide, silica, alumina, zirconia, titania, or a combination thereof.

As the substrate 105 with the coating composition 101 disposed thereon emanates from the container 106, the solvent is removed from the coating composition. The solvent is typically removed by drying the substrate and/or subjecting it to a reduced pressure (e.g., a vacuum). Drying of the coating can be performed by heating, air drying, air flow drying, and so forth. Drying of the coating can also take place by irradiating with an infrared lamp within or outside of the container (not shown). In some embodiments, the lamp can surround the outside of the container. Additional processes such as curing may be performed on the coating composition. If the coating composition contains any reactants, it may be subjected to conditions that facilitate the reaction. For example, if the binder is prepared by reacting a polymer precursor, then the coating composition may be subjected to a temperature and to electromagnetic radiation that facilitates the reaction. In an embodiment, the coating composition is subjected to one or more of ultraviolet radiation, infrared radiation, xrays, electron beam radiation, or a combination thereof to further react the coating composition. Reacting the coating composition can include curing of a cross-linkable composition to produce a thermoset. For example, a UV lamp can be used to crosslink the coating. Crosslinking can take place via chemical processes in the absence of irradiation.

Suitable crosslinking agents include glyoxal, glutaraldehyde, sodium borate (borax), citric acid and combinations thereof. In some embodiments, the crosslinking agent can be a bivalent metal ion such as $Ca^{2+}$, $Cu^{2+}$, $Ni^{2+}$, $Mg^{2+}$, $Zn^{2+}$, or a combination thereof.

In an embodiment, the crosslinking of the coating can provide improved barrier properties of low oxygen permeability and low water vapor permeability. The oxygen transmission rate of the coating can be less than about 3 cubic centimeters per square meter per day ($cc/m^2/day$). The water vapor transmission rate of the coating can be less than about 6 grams per meters squared per day ($g/m^2/day$). The coating can have a thickness of about 10 nm to about 100 micrometers or about 200 nm to about 5000 nm. In some embodiments, the coating can have a thickness of about 300 nm.

As noted above, the high aspect ratios of the nanosheets facilitate a preferred orientation of these fillers on the substrate surface. A plurality of nanosheets 102 in the coating have their major surfaces (surfaces with the largest surface area) (major surface 111, see FIG. 1B) oriented substantially parallel to the substrate surface upon which they are disposed. The major surface 111 is the surface whose area is a product of the length and width and has the largest surface area of any surface of the nanosheet.

The orienting of the nanosheets with their largest surface areas parallel to the substrate permits them to cover large portions of the surface area of the substrate. In such a manner, the nanosheets form good barriers against the transport or diffusion of gases or fluids in a direction perpendicular to the surface of the substrate. In an embodiment, the orientation of the nanosheets with their largest surface areas arranged parallel to the substrate surface results in the formation of a plurality of layers of nanosheets, where each layer is substantially parallel to the substrate surface. The overlapping of sheets between the nanosheet layers enhances the barrier properties of the coating. In order to diffuse across the coating, an ambient molecule would have to travel a tortuous pathway around the interleaved nanosheets, thus making diffusion extremely difficult.

As noted above, the nanosheets 102 in the coating are arranged to be substantially parallel to the substrate 105. They are however interleaved on the surface. In other words, there is some amount of overlap between the nanosheets in different layers. The nanosheets are arranged with their respect longitudinal axes AA' (See FIG. 1B) to be substantially parallel to a surface of the substrate upon which they are disposed. In an embodiment, the average orientation between the longitudinal axes of the nanosheets and the substrate may vary between up to ±10 degrees to the substrate surface or up to ±5 degrees to the substrate surface. The longitudinal axis of a nanosheet is an axis that passes through the center of mass of the nanosheet and is parallel to the largest dimension (in this case the length L) of the nanosheet.

In an embodiment, the nanosheets 102 on the substrate surface are periodically spaced in a direction parallel to the substrate as well in a direction perpendicular to the substrate. In an embodiment, the periodic spacing (the periodicity) between nanosheets parallel to the substrate is smaller than the periodic spacing between nanosheets in a direction perpendicular to the substrate. The optical properties, barrier properties, and mechanical strength of the coating can be modulated by changing the concentration of the nanosheets in the coating.

While the method disclosed above involves the transportation of a substrate through a container that contains the coating composition, there are other methods of deposition that can produce the same orientation effect of the nanosheets on the substrate. For example, a travelling substrate can be coated using spray painting, electrostatic spray painting, roll coating, doctor blading, or the like, or a combination thereof. The coating process can be a continuous process or a batch process. In a batch process, individual substrates can be transported on a conveyor belt that travels horizontally before it travels vertically and is dried vertically. In another embodiment, the coating can be disposed on non-travelling vertical surfaces such as walls. Walls (or other vertical surfaces) may be coated using spray painting.

In an embodiment, the substrate with the cured, dry coating disposed thereon may be subjected to additional processing. For example, the coated substrate may be subjected to molding, vacuum forming, thermoforming, and so on to form an article (e.g., trays, bottles, containers, dishes, or the like) that may be used for the storage of ingestible solids and/or fluids. Examples of ingestible solids and/or fluids include meats, salad dressing, soups, jams, frozen ready-to-eat meals, pickles, water, fruit juices, or the like.

In another embodiment, the coating may be removed from the substrate to form an independent free-standing film without any backing. The film may be used as a wrapping for food products such as meats, fruits, vegetables, and the like. It may be used to vacuum seal food products because of its barrier properties (e.g., its resistance to intrusion of moisture and oxygen). The film may be printed upon to indicate the food item that it is meant to protect. The surface of the coating may also be used to print advertising on. In the film, the plurality of nanosheets are arranged in layers and are oriented with their largest surfaces being substantially parallel to a surfaces of the film.

The orientation of the nanosheets in the coating produces a number of advantageous properties. Coatings from the disclosed coating compositions display superior barrier properties, mechanical properties, and can be modulated for optical properties (e.g., increased opacity or increased transparency). These properties can all be tuned (varied) depending upon the conditions that the coating will be subjected to. The coating, coating composition and the method of manufacturing are all exemplified by the following non-limiting examples.

EXAMPLES

Materials

The materials used include the following:
polyvinyl alcohol (PVA) [Mowiol 15-99, viscosity: 15 centipoise (cP), degree of hydrolysis: 99.0-99.8%, Kuraray];

EXCEVAL PVA (Poval EXCEVAL™ RS-2117, degree of hydrolysis: 97.5%-99.0%, Kuraray);
sodium montmorillonite (MMT, PGN nano clay, Mineral Technologies Inc.);
glutaraldehyde (GA, 50 weight percent (wt %) aqueous solution, Sigma-Aldrich);
hydrochloric acid (HCl, 37 wt %, Fisher Scientific);
zinc chloride ($ZnCl_2$, anhydrous 98+%, Alfa Aesar);
polyethylene terephthalate (PET) film (thickness: 25.4 micrometers) was obtained from FLEXcon Company, Inc.
Pixelle PointFlex paper substrate (104 grams per square meter (gsm), coated one side (C1S)) was obtained from Sonoco Products Company.

Example 1—Preparation of Jan. 1, 1998 PVA/MMT Suspensions 10.0 wt % PVA solutions were prepared by adding the desired PVA pellets to deionized (DI) water, stirring and heating constantly until dissolved (approximately 1 to 2 hours). A 1.5 wt % MMT dispersion was prepared by adding the dry MMT to DI water, stirring constantly overnight or until uniformly dispersed. After the stock solutions were prepared, DI water was added to the MMT stock solution and ultrasonicated for 1 h in an ultrasonication bath (Branson 8510R-MT, 250 W, 44 kHz). Next, the PVA stock solution of the desired grade was slowly added to the MMT dispersion, followed by 1 hour of stirring. The PVA/MMT mixture was then sonicated for 1 hour. The final nanocoating suspension contained 2.0 wt. % solids with equivalent mass percentages of PVA and MMT (1.0 wt % PVA, 1.0 wt % MMT, 98.0 wt % DI water). For the paper coated samples only, amounts of GA crosslinker (with HCl as catalyst in 1:5 mole ratio Cl to GA) in molar ratios of 1:20 and 1:15 (GA to hydroxy groups on PVA chains) were added to the nanocoating suspension.

Example 2—Preparation of nPVA/$Zn^{2+}$ Coating Solutions

A 10.0 wt % PVA 15-99 solution was prepared by adding the PVA pellets to DI water, stirring and heating constantly until dissolved (approximately 1 to 2 hours). Subsequently, $ZnCl_2$ and 10.0 wt % PVA 15-99 solution were slowly added to DI water for a 2.0 wt % total solids solution. Four different mole ratios were prepared: 3:1 (3PVA/$Zn^{2+}$), 15:1 (15PVA/$Zn^{2+}$), 30:1 (30PVA/$Zn^{2+}$), and 60:1 (60PVA/$Zn^{2+}$). The nPVA/$Zn^{2+}$ solutions were stirred for 2 hours.

Example 3—Dip Coating Method

A two-dimensional substrate of about 12.7 centimeters (cm) by about 17.8 cm was coated by dipping in a suspension of Jan. 1, 1998 PVA/MMT as illustrated in FIG. 1. The coated substrate was then vertically hung in an oven at 60° C. for 30 minutes to be dried and co-crosslinked. This dip coating process was repeated for four coating cycles, with the purpose of ensuring that coating pinholes were eliminated, and uniformity was achieved. In between each coating cycle, the sample was rotated 180° to inhibit the formation of flow-induced thickness gradients from gravitational forces during the vertical drying.

Example 4—Roll-to-Roll Coating (Mayer Rod Coating)

For a large-scale pilot trial, approximately five gallons of Jan. 1, 1998 PVA/MMT nanocoating suspension (not crosslinked) was prepared and maintained under constant stirring until the time of the trial. Prior to the beginning of the trial, the nanocoating suspension was ultrasonicated using an ultrasonication probe (Misonix Sonicator 3000, 600 watts, 20 kilohertz) for 5 minutes. Ultrasonication of the bulk coating suspension was performed to ensure agglomeration of nanosheets during short-term storage of solution was exfoliated.

The prepared and ultrasonicated Jan. 1, 1998 PVA/MMT nanocoating suspension was brought to a Mayer Rod roll-to-roll coating assembly at FLEXcon Company, Inc. The coating assembly consisted of the coating fluid pan, in which an applicator roll was rotating and applying an unmetered amount of coating suspension onto the substrate, as well as two Mayer Rod bars in succession, 30 gauge and 20 gauge, respectively. The Mayer Rod bars were employed to fine-tune the metering of nanocoating suspension and generate sufficient shear force on the nanosheets for good orientation. The Mayer rod bars were rotated in the opposite direction of the substrate travel direction to increase shear forces nanosheets and nanosheet orientation. The 25.4 micrometers thick PET substrate was used for this trial and was fed through the coating assembly at a rate of 10 feet per minute. After coating, the coated substrate was moved through a series of guide rolls into a flotation oven at an angle of 64°. The coated substrate was subsequently dried at 175° F. for a length of 30 feet. After drying, the coated substrate went again through a series of guide rolls to a rewinder. This coating process was performed repeated up to four times (passes 1 to 4). A sample of the coated PET was taken from each pass for analysis.

Testing Equipment and Conditions

The water vapor transmission rate (WVTR) of the coated samples were characterized using a Ametek Mocon PER-MATRAN-W Model 1/50 G in accordance with ASTM E398. Samples were tested at 23° C. and 50% relative humidity (RH), as well as 27° C. and 80% RH.

The oxygen transmission rate (OTR) of the coated samples were characterized using a MOCON OX-TRAN 1/50 OTR tester at 23° C. and 0% RH in accordance with ASTM D3985.

The thickness of the coating was measured with a Semiconsoft MProbe Thin Film Measurement System. Five thickness measurements were obtained on at least two independent coated samples for the stated coating conditions. The average values and standard deviations (std. dev.) are reported. The area density of the coatings were calculated based on the average mass of the coating thickness for the stated coating conditions versus the surface area.

The x-ray diffraction (XRD) patterns of the coated samples were recorded on a Bruker D2 diffractometer using Bragg-Brentano theta-2theta (θ-2θ) geometry using a graphite monochromator with copper K-alpha (Cu Kα) radiation and a wavelength of 1.5418 angstroms (Å).

Figure 3:
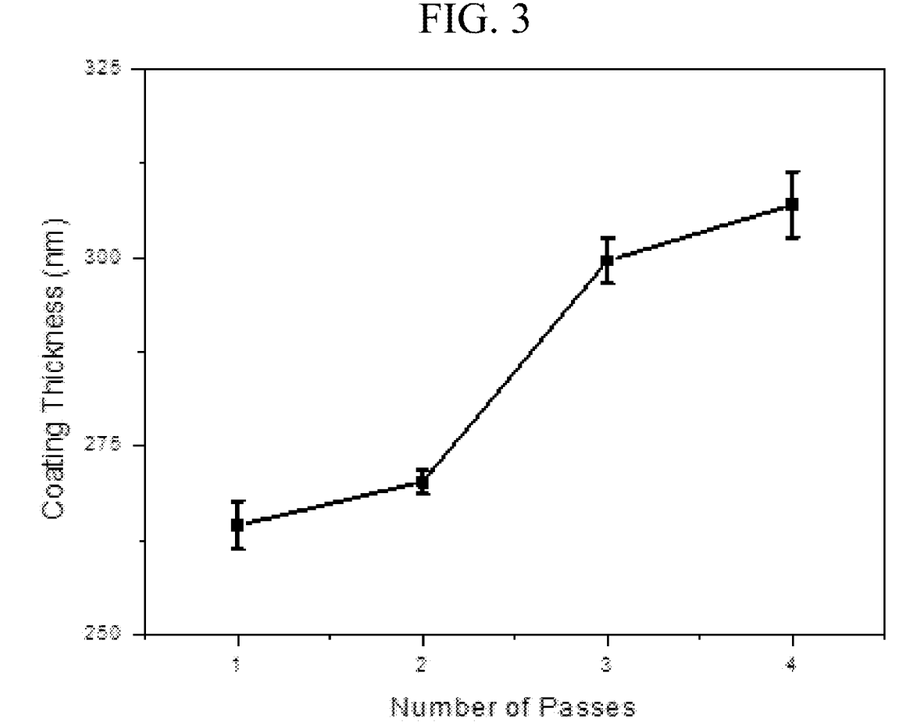
FIG. 3 is a graph illustrating the average coating thickness in nanometers (nm) versus number of passes for coatings of MMT nanosheets prepared in accordance with Example 5.
Figure 4:
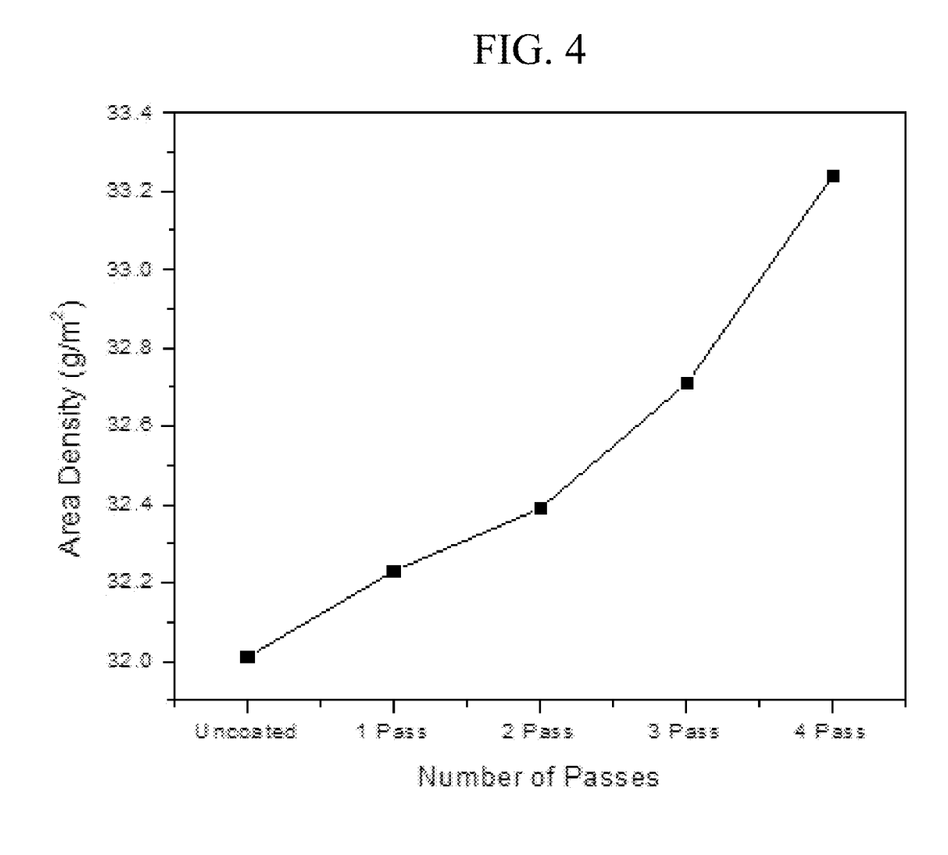
FIG. 4 is a graph illustrating the average area density in grams per meter squared ($g/m^2$) versus number of passes for coatings of MMT nanosheets prepared in accordance with Example 5.

Example 5—Testing Results for Jan. 1, 1998 PVA/MMT Nanocoatings on PET by Mayer Rod roll-to-roll coating The samples prepared from Jan. 1, 1998 PVA/MMT nanosuspension as described in Example 1 via the coating method as described in Example 4 were analyzed for OTR, WVTR, XRD patterns, coating thickness, and area density under the testing conditions listed above. The results for OTR, WVTR, and XRD patterns are listed in Table 1, Table 2, and FIG. 2, respectively. The coating thicknesses and area densities are shown in FIG. 3 and FIG. 4, respectively.

As shown in Table 1 and Table 2, lower oxygen transmission rates and lower water vapor transmission rates were observed for additional passes of the coating upon the PET substrate. Without wishing to be bound by theory, these results support the hypothesis that additional coating layer provides a more tortuous path for gas and vapor passage through the nanocoatings.

Figure 2:
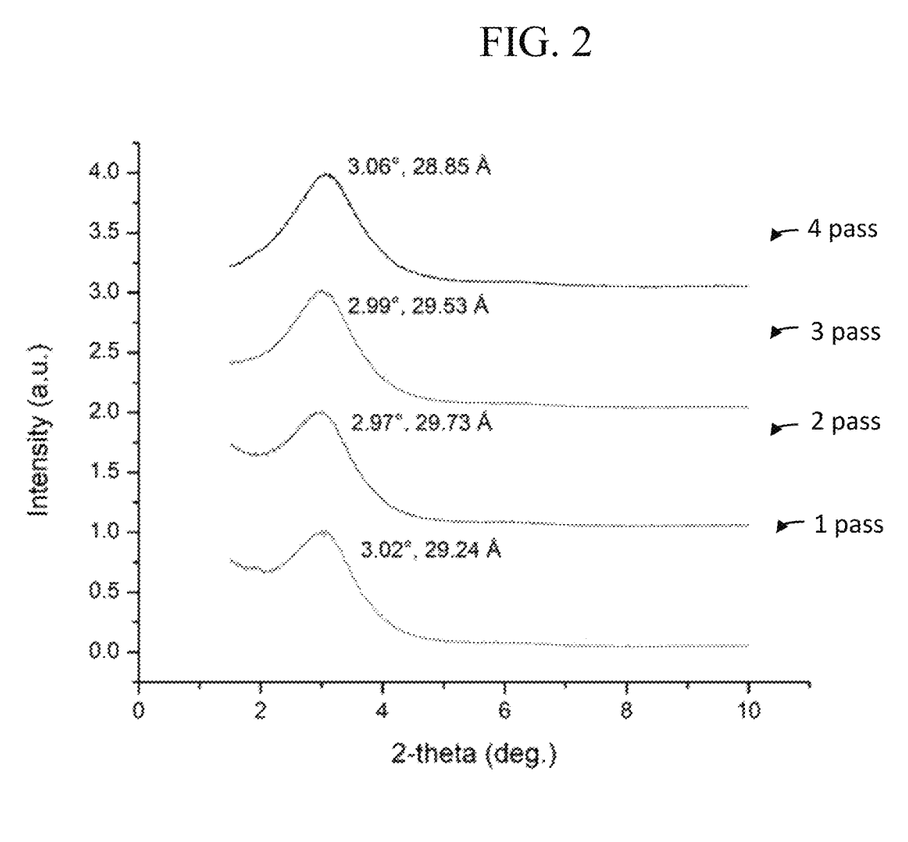
FIG. 2 is a graph illustrating x-ray diffraction patterns of intensity in arbitrary units (a.u.) versus angle of the 2-theta peak in degrees (deg.) for coating passes 1 to 4 for MMT nanosheets prepared in accordance with Example 5. The angle of the 2-theta peak and related d-spacing [in angstroms (Å)] of the nanosheets are adjacent to the diffraction patterns.

The XRD patterns as illustrated in FIG. 2, demonstrate that increased number of coating passes decreased the d space (from 29.24 angstroms (Å) for a single pass to 28.85 Å for four passes) demonstrating tighter packing of the nanosheets within the coating.

The average coating thickness of the samples were about 300 nanometers with increasing thickness for additional coating passes on the PET substrate. The average area densities were about 32 grams per square meter with increasing coating density with additional coating passes.

TABLE 1

OTR in cubic centimeters per square meter per day ($cc/m^2$/day) tested at 23° C., 0% RH, 100% $O_2$.

| Replicate # | 1 Pass | 2 Pass | 3 Pass | 4 Pass |
|---|---|---|---|---|
| 1 | 4.19 | 0.217 | 0.031 | <0.00465 |
| 2 | 1.55 | 0.372 | 0.403 | <0.00465 |
| Mean | 2.87 | 0.295 | 0.217 | <0.00465 |
| Std. Dev. | 1.86 | 0.110 | 0.263 | 0.00 |

TABLE 2

MVTR in grams per square meter per day ($g/m^2$/day) tested at 26.7° C., 80% RH.

| Replicate # | 1 Pass | 2 Pass | 3 Pass | 4 Pass |
|---|---|---|---|---|
| 1 | 10.70 | 3.10 | 2.33 | 2.17 |
| 2 | 3.57 | 3.72 | 2.48 | 2.17 |
| Mean | 7.13 | 3.41 | 2.40 | 2.17 |
| Std. Dev. | 5.04 | 0.438 | 0.110 | 0.00 |

Example 6—Testing Results for Jan. 1, 1998 EXCEVAL PVA/MMT Nanocoatings on the Pixelle PointFlex Paper Substrate with GA/HCl Crosslinking The samples prepared from Jan. 1, 1998 PVA/MMT nanosuspension as described in Example 1 via the dip coating method as described in Example 3 were analyzed for WVTR under the testing conditions listed above. The WVTR results are shown in Table 3. The crosslink ratio is the ratio of GA to hydroxy groups on the PVA chains. As shown in Table 3, the WVTR decreases with increased crosslinking of the coating. The WVTR results indicate that the crosslinked polymer is more tightly packed with increased crosslinking.

TABLE 3

WVTR results for GA crosslinked Jan. 1, 1998 PVA/MMT nanocoatings on Pixelle PointFlex paper substrate

| Crosslink Ratio | WVTR ($g/m^2$/day) (50% RH, 23° C.) | WVTR ($g/m^2$/day) (80% RH, 27° C.) |
|---|---|---|
| 1:20 | 0.21 | 13.49 |
| 1:15 | 0.09 | 1.06 |

Example 7—Testing Results for nPVA/Zn$^{2+}$ Nanocoatings on the Pixelle PointFlex paper substrate The samples prepared from nPVA/Zn$^{2+}$ coating solutions as described in Example 2 via the dip coating method as described in Example 3 were analyzed for WVTR under the testing conditions listed above. The WVTR results are shown in Table 4. As shown in Table 4, the WVTR decreases with increased crosslinking of the coating. The WVTR results indicate that the use of the Zn$^{2+}$ crosslinker reduces the WVTR. Furthermore, increased PVA in the crosslinked coating improves the WVTR.

TABLE 4

WVTR results for Zn$^{2+}$ crosslinked PVA/MMT nanocoatings on Pixelle PointFlex paper substrate.

| Coating Type | WVTR (g/m$^2$/day) (50% RH, 23° C.) | WVTR (g/m$^2$/day) (80% RH, 27° C.) |
|---|---|---|
| PVA | 6.83 | 63.39 |
| 3 PVA/Zn$^{2+}$ | 2.85 | 75.23 |
| 15 PVA/Zn$^{2+}$ | 2.76 | 57.06 |
| 30 PVA/Zn$^{2+}$ | 0.28 | 53.28 |
| 60 PVA/Zn$^{2+}$ | 0.32 | 55.91 |

All statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Various other components may be included and called upon for providing for aspects of the teachings herein. For example, additional materials, combinations of materials and/or omission of materials may be used to provide for added embodiments that are within the scope of the teachings herein. Adequacy of any particular element for practice of the teachings herein is to be judged from the perspective of a designer, manufacturer, seller, user, system operator or other similarly interested party, and such limitations are to be perceived according to the standards of the interested party.

In the disclosure hereof any element expressed as a means for performing a specified function is intended to encompass any way of performing that function including, for example, a) a combination of circuit elements and associated hardware which perform that function or b) software in any form, including, therefore, firmware, microcode or the like as set forth herein, combined with appropriate circuitry for executing that software to perform the function. Applicants thus regard any means which can provide those functionalities as equivalent to those shown herein. No functional language used in claims appended herein is to be construed as invoking 35 U.S.C. § 112 (f) interpretations as "means-plus-function" language unless specifically expressed as such by use of the words "means for" or "steps for" within the respective claim.

When introducing elements of the present invention or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements. The term "exemplary" is not intended to be construed as a superlative example but merely one of many possible examples.

What is claimed is:

1. An article comprising:
   a substrate; and
   a coating disposed on the substrate; where the coating comprises:
      a binder; and
      a plurality of nanosheets, where the plurality of nanosheets are arranged in layers and are oriented with their largest surfaces being substantially parallel to a surface of the substrate upon which they are disposed; where the plurality of nanosheets are exfoliated by the binder and where the nanosheets are uniformly dispersed in the binder; where a periodicity between the plurality of nanosheets parallel to the substrate is smaller than a periodicity between nanosheets in a direction perpendicular to the substrate.

2. The article of claim 1, where a portion of the plurality of nanosheets are interleaved.

3. The article of claim 1, where an average orientation angle between a longitudinal axis of the plurality of nanosheets and the substrate may vary up to +10 degrees with the surface of the substrate; where the longitudinal axis of a nanosheet is an axis that passes through the center of mass of the nanosheet and is parallel to the largest dimension of the nanosheet.

4. The article of claim 1, where the plurality of nanosheets have lengths and/or widths of 10 to 5,000 nanometers and thicknesses of 1 to 100 nanometers.

5. The article of claim 1, where the plurality of nanosheets have aspect ratios of 10 to 5,000.

6. The article of claim 1, where the coating has a thickness of 10 nanometers to 100 micrometers.

7. The article of claim 1, where the binder comprises an organic polymer.

8. The article of claim 7, where the organic polymer is water soluble.

9. The article of claim 7, where the organic polymer is crosslinked.

10. The article of claim 1, where the article is used for packing foods.

11. A film including:
    a binder; and
    a plurality of nanosheets, where the plurality of nanosheets are arranged in layers and are oriented with their largest surfaces being substantially parallel to a surface of the film; where the plurality of nanosheets are interleaved and where a periodicity between the plurality of nanosheets parallel to the substrate is smaller than the periodicity between nanosheets in a direction perpendicular to the substrate.

12. The film of claim 11, where the binder is a crosslinked polyvinylalcohol and where the plurality of nanosheets are derived from montmorillonite.

13. A method of coating a substrate comprising:
    transporting a substrate through a coating composition in a first position; where the coating composition comprises a plurality of nanosheets; a binder and a solvent; where the plurality of nanosheets have lengths and/or widths of 10 to 5,000 nanometers and thicknesses of 1 to 100 nanometers; and
    transporting the substrate with the coating composition disposed thereon through a second position; where the second position is inclined at an angle to the first position; where an opposing force acts upon the coating composition in the second position and facilitates an orientation of the plurality of nanosheets; and producing an article, wherein the article comprises:

the substrate; and a coating disposed on the substrate; where the coating comprises:

the binder; and the plurality of nanosheets, where the plurality of nanosheets are arranged in layers and are oriented with their largest surfaces being substantially parallel to a surface of the substrate upon which they are disposed; where the plurality of nanosheets are exfoliated by the binder and where the nanosheets are uniformly dispersed in the binder; and wherein the nanosheets are arranged such that a periodicity between the plurality of nanosheets parallel to the substrate is smaller than a periodicity between nanosheets in a direction perpendicular to the substrate.

14. The method of claim 13, where the opposing force is gravity.

15. The method of claim 13, where an amount of orientation of the plurality of nanosheets is proportional to at least one of the velocity of transportation of the substrate, the angle between the first position and the second position and a distance travelled by the substrate.

16. The method of claim 15, where the angle between the first position and the second position is 60 to 120 degrees.

17. The method of claim 13, further comprising molding the substrate with the coating disposed thereon to form a container.

18. The method of claim 14, where the first position is a horizontal position while the second position is a vertical position.

* * * * *